C. W. VAN BRUNT AND L. EDWARDS.
EXTENSION PERCH FOR SPRINGS.
APPLICATION FILED JUNE 3, 1920.
1,374,617.
Patented Apr. 12, 1921.
2 SHEETS—SHEET 2.
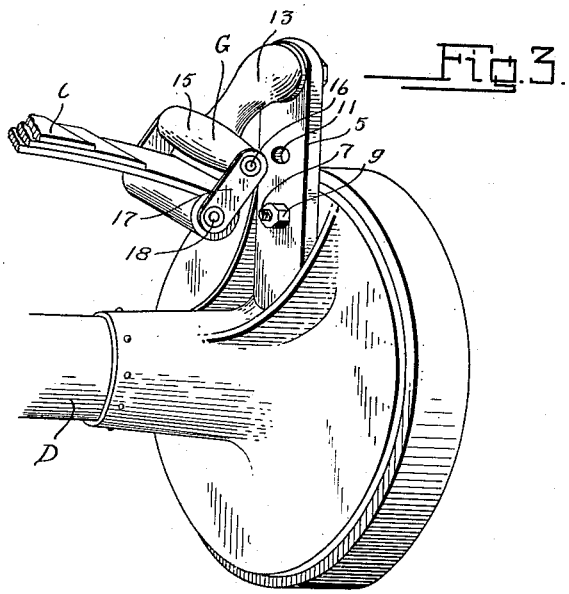
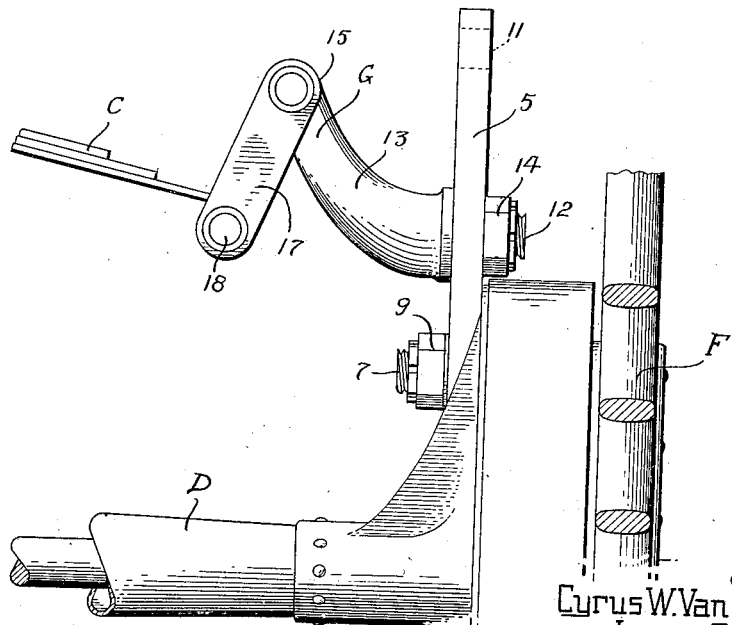
Inventors
Cyrus W. Van Brunt.
Loren Edwards.

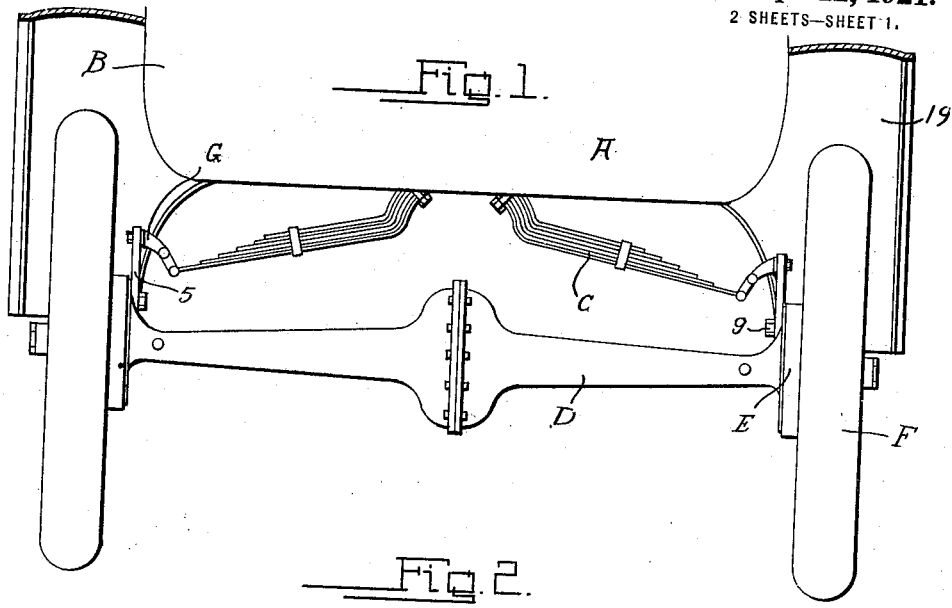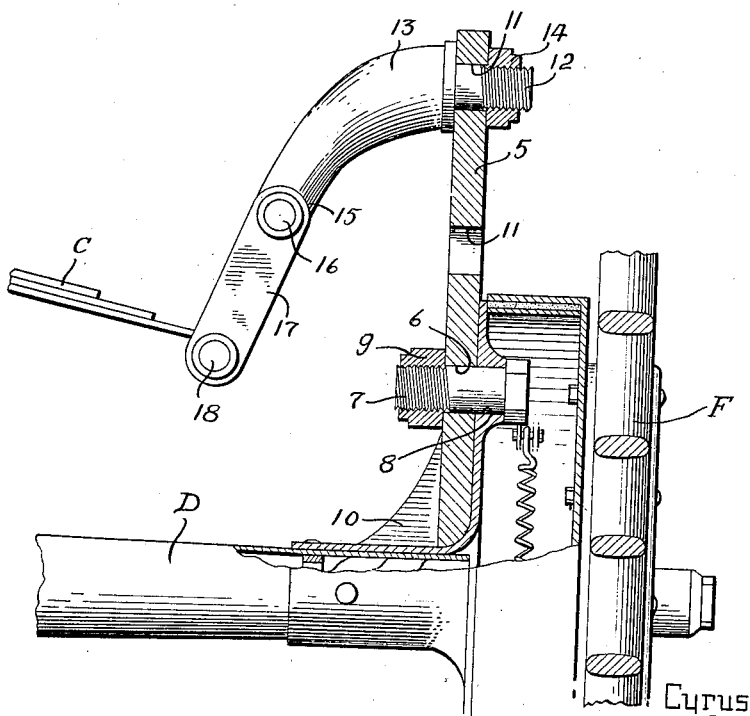

UNITED STATES PATENT OFFICE.

CYRUS W. VAN BRUNT AND LORIN EDWARDS, OF DURAND, WISCONSIN.

EXTENSION-PERCH FOR SPRINGS.

1,374,617.　　　　　Specification of Letters Patent.　　Patented Apr. 12, 1921.

Application filed June 3, 1920. Serial No. 386,317.

*To all whom it may concern:*

Be it known that we, CYRUS W. VAN BRUNT and LORIN EDWARDS, citizens of the United States, residing at Durand, in the county of Pepin and State of Wisconsin, have invented certain new and useful Improvements in Extension - Perches for Springs, of which the following is a specification.

This invention relates to extension perches for vehicle springs, and the primary object of the invention is to provide an improved extension perch for the springs of motor vehicles, so as to permit the body of the vehicle to be held at such a point in relation to the chassis, that when the same is under a full load, the fenders of the body will not come into engagement with the wheels and the body into engagement with the axle housing.

Another object of the invention is to provide an improved extension perch for the springs of motor vehicles which is so constructed as to permit a relatively large clearance for the vehicle springs, thereby permitting the same to expand to their maximum point.

A further object of the invention is to provide a means whereby the supporting shackle for the springs may be held in various adjusted positions in relation to the extension plate of the perch, so that the extension perch may be conveniently used with cars of various types and sizes.

A still further object of this invention is to provide an improved extension perch for motor vehicles which is exceedingly simple in construction, durable and efficient in use, one that can be placed upon the market at a reasonable cost and readily associated with a motor vehicle.

With these and other objects in view, the invention consists in the novel construction, arrangement and formation of parts as will be hereinafter more specifically described, claimed and illustrated in the accompanying drawings, forming a part of this specification, in which drawings:

Figure 1 is a rear elevation of a motor vehicle showing parts of the same in section and illustrating the improved extension perch connected to the supporting springs thereof.

Fig. 2 is an enlarged fragmentary vertical section through the extension perch and axle and brake housing showing the means for connecting the perch with the housing and with the springs.

Fig. 3 is a detail perspective view of the improved extension perch showing the same in position on an axle housing.

Fig. 4 is an enlarged fragmentary elevation of the extension perch, showing the supporting shackle thereof connected to the spring plate in a different manner.

Referring to the drawings in detail, wherein similar reference characters designate corresponding parts throughout the several views, the latter A indicates a motor vehicle which may be of any preferred type or make and as shown includes the body B, the transversely extending semi-elliptical supporting spring C, the rear axle housing D, the brake drum casing E and the wheels F.

The letter G generally indicates the improved extension perch and the same includes an elongated substantially rectangular plate 5 which is disposed in substantially vertical relation to the axle housing D and the same is provided with a lower aperture 6 which is adapted to receive a retaining bolt 7, which is positioned through the opening 8 formed in the brake housing for the reception of the usual supporting perch for which the extension perch is substituted. A retaining nut 9 engages the outer end of the bolt 7 and holds the plate 5 against accidental displacement. The lower end of the plate as shown is positioned between the bracing ribs 10 which absolutely prevent swinging movement of the plate 5 on the bolts 7 as a pivot. The plate 5 above the aperture 6 is provided with a pair of spaced openings 11, which are adapted to receive the shank 12 of the supporting horn 13. The horn 13 may be of a special construction or it can be the perch generally used for supporting the spring C.

As shown in Figs. 1 to 3 the shank of the perch 13 is positioned in the uppermost opening 11 and the outer arcuate end thereof is disposed downwardly, as clearly shown in these figures. The shank 12 of the horn 13 is held in place by suitable removable nuts 14. The outer arcuate curved end of the horn 13 is provided with an apertured boss 15, which is adapted to receive the pin 16 for supporting the usual spring retaining shackle 17, the lower end of which is pivotally connected to the terminals of the spring C by means of pins 18.

By the provision of the extension perch, it can be seen that the body of the vehicle A is raised a considerable distance above the chassis which spaces the fenders 19 of the body from the wheels F. Thus when the body is under full load and the springs C are depressed the fenders 19 will be prevented from coming into contact with the tires of the wheels when the vehicle is being used on rough roads. Serious mishaps often occur from the use of a vehicle when the same is overloaded, when the fenders come into contact with the tires of the supporting wheels. Further the body often bumps or hits against the differential casing of the vehicle causing severe strains to be transmitted thereto. The fenders coming in contact with the tires quickly wear the same out and when it is necessary to use skid chains the same often cause a continuous racket by coming into contact with the fenders. Thus it can be seen that by the provision of the improved extension perch all of the above enumerated disadvantages are overcome. Further, by provision of the extension perch, the spring C is permitted to be compressed to its maximum point as a considerable clearance is given to the ends thereof by the formation of the perch.

In Fig. 4 is shown the horn 13 positioned in the lower opening 11 with its outer arcuate end disposed uppermost. In this instance the supporting shackle 17 will extend downwardly from the boss 15 which will permit the shackle to swing inwardly toward the horn. The horn may, in this instance, form means for engaging the lower supporting pin 18, and thus limit the full compression of the spring C which is sometimes desirable.

Changes in details may be made without departing from the spirit or scope of this invention; but,

We claim:

1. An extension perch for motor vehicle springs comprising an elongated plate having a plurality of apertures therein, an arcuately curved supporting arm arranged to removably fit in any one of said apertures, means for holding the horn against accidental displacement, a pivoted shackle carried by the inner end of the horn, and means for pivotally connecting the inner end of the shackle to a vehicle spring.

2. A support for vehicle springs comprising a substantially rectangular flat plate having a plurality of openings formed therein, an inwardly extending supporting horn, said horn having a reduced shank arranged to fit in any one of said openings, means for holding the shank against movement on the plate, the inner end of the shank having a relatively long apertured boss formed thereon, a pivot pin carried by the boss, a shackle secured to said pivot pin, and means connecting the inner end of the shackle with the spring of a vehicle.

3. The combination with a vehicle including a body, a supporting spring thereof, and a brake casing, of an extension perch for the spring comprising a relatively long plate, means detachably connecting the lower end of the plate to the brake housing, said plate extending above the brake housing, the plate having a plurality of openings formed in the portion thereof extending above the brake housing, an inwardly extending horn arranged to be detachably secured in any one of said openings, and a spring shackle secured to the inner end of said horn for engagement with the vehicle spring.

4. The combination with a vehicle including a body, a supporting spring therefor, and a brake casing, the casing having an opening formed therein, of an extension perch for the spring comprising an elongated vertically disposed plate, a removable bolt arranged to extend through the opening formed in the brake housing, and an opening formed in the plate, said plate extending above the brake housing and having a plurality of openings formed therein, an arcuately curved horn, a reduced shank formed on said horn and arranged to detachably fit in either one of said openings, a transversely extending apertured boss formed on the inner end of said horn, a shackle pivotally secured to said boss, and means pivotally connecting the inner end of said shackle to the spring.

CYRUS W. VAN BRUNT.
LORIN EDWARDS.